United States Patent
Haller et al.

(10) Patent No.: US 6,488,994 B1
(45) Date of Patent: Dec. 3, 2002

(54) STRIP-SHAPED MOULD CAVITY FOR PRODUCING SURFACING MATERIALS AND METHOD FOR PRODUCING A MOULD CAVITY OF THIS TYPE

(75) Inventors: Heinz Haller, Plochingen (DE); Joachim Schwilk, Köngen (DE)

(73) Assignee: WKP Wurttembergische Kunststoffplatten-Werke GmbH & Co. KG, Unterensingen (DE)

( * ) Notice: Subject to any disclaimer, the term of this patent is extended or adjusted under 35 U.S.C. 154(b) by 0 days.

(21) Appl. No.: 09/508,651

(22) PCT Filed: Sep. 21, 1998

(86) PCT No.: PCT/EP98/06018

§ 371 (c)(1),
(2), (4) Date: May 17, 2000

(87) PCT Pub. No.: WO99/15325

PCT Pub. Date: Apr. 1, 1999

(30) Foreign Application Priority Data

Sep. 22, 1997 (DE) .......................... 197 41 680

(51) Int. Cl.⁷ .............................. B05D 1/38; B05D 3/06
(52) U.S. Cl. ..................... 427/500; 427/504; 427/510; 427/511; 427/514; 427/551; 427/552; 427/558; 427/261; 427/262; 427/280; 427/402

(58) Field of Search ................................ 427/261, 262, 427/267, 280, 288, 558, 559, 551, 552, 510, 511, 514, 496, 500, 504, 402

(56) References Cited

U.S. PATENT DOCUMENTS

| | | | |
|---|---|---|---|
| 3,667,994 A | | 6/1972 | Ward |
| 3,936,541 A | * | 2/1976 | Plowman et al. ............ 427/262 |
| 4,289,821 A | * | 9/1981 | Gray, III et al. ............ 428/172 |
| 4,322,450 A | | 3/1982 | Gray, III et al. |
| 4,464,423 A | * | 8/1984 | LaBianca et al. ............ 427/244 |
| 5,407,708 A | * | 4/1995 | Lovin et al. ................. 427/493 |
| 5,468,542 A | | 11/1995 | Crouch |
| 6,214,424 B1 | * | 4/2001 | Chubb et al. ................ 427/165 |

FOREIGN PATENT DOCUMENTS

EP 0079759 5/1983

* cited by examiner

Primary Examiner—Shrive P. Beck
Assistant Examiner—Kirsten A. Crockford
(74) Attorney, Agent, or Firm—Bachman & LaPointe, P.C.

(57) ABSTRACT

In a strip-shaped mould for producing surface materials, in particular surfaces of melamine resin in the production of laminate panels, with a structured surface, a flexible strip (10) of paper or foil is provided with a layer (12) having a separating action in relation to the surface material, with the formation of slightly cross-linked regions, and a three dimensional shaped structure consisting of UV-hardening printing inks is applied thereto.

4 Claims, 1 Drawing Sheet

STRIP-SHAPED MOULD CAVITY FOR PRODUCING SURFACING MATERIALS AND METHOD FOR PRODUCING A MOULD CAVITY OF THIS TYPE

BACKGROUND OF THE INVENTION

The invention concerns a strip-shaped mould for producing surface materials—in particular surfaces of melamine resin in the production of laminated panels or synthetic resin-covered chipboard panels—with a structured surface. The invention also concerns a method of producing such a mould.

The production of for example laminate panels in continuously operating presses usually involves employing structured pressing plates or pressing belts with which those surface materials can be provided with a structure. Smooth and structured separating papers are also used, the structure of which is impressed into the paper or whose separating coating is applied by a structured roller.

In recognition of those aspects, the inventor set himself the aim of simplifying the shaping procedure and in particular affording a mould of the kind set forth in the opening part of this specification, which can be easily and inexpensively produced and handled.

SUMMARY OF THE INVENTION

In accordance with the invention the mould is a flexible strip or web of paper or foil with a layer which is separating in relation to the respective surface material and which is incompletely irradiation-cross-linked. A three-dimensional shaped structure of UV-hardening printing inks is applied to that separating layer. By virtue of that incomplete cross-linking, it is possible for the applied printing inks to be joined directly to the flexible strip and for the entire composite then to be hardened.

In contrast to the state of the art, it is possible in this case for the structure to be applied to a smooth, incompletely hardened coating in a simple manner using rollers which in comparison are inexpensive and which are engraved in the appropriate fashion.

In a preferred embodiment the separating layer is made from a lacquer which has a separating action in relation to melamine resin; that mould can then be readily used for structuring manufactured laminate panels of melamine resins.

The invention also embraces a method in which the flexible strip of paper foil is coated with a separating lacquer and the latter is incompletely irradiation-cross-linked, whereupon the composite strip produced in that way is printed with UV-hardening printing inks in a structured surface and the composite is hardened with high-dose electrons.

In accordance with a further feature of the invention the printing inks are preferably hardened with UV-light.

It has also proven advantageous to apply 6 g of separating EBH-lacquer —electron beam-hardenable—to a paper which is coated in one stage—for example weighing 70 g/m$^2$—and then to produce a structure which is about 10 micrometers high from the printing inks.

In order to achieve simple colouring of the surface material, the raised structure can be enriched with dyes which are sublimated into the surface material during the pressing operation which is implemented in the press.

BRIEF DESCRIPTION OF THE DRAWINGS

Further advantages, features and details of the invention will be apparent from the description hereinafter of a preferred embodiment and with reference to the drawing in which the single FIGURE shows a view in section through a strip-shaped mould for producing surface materials.

DESCRIPTION

Figure 1:
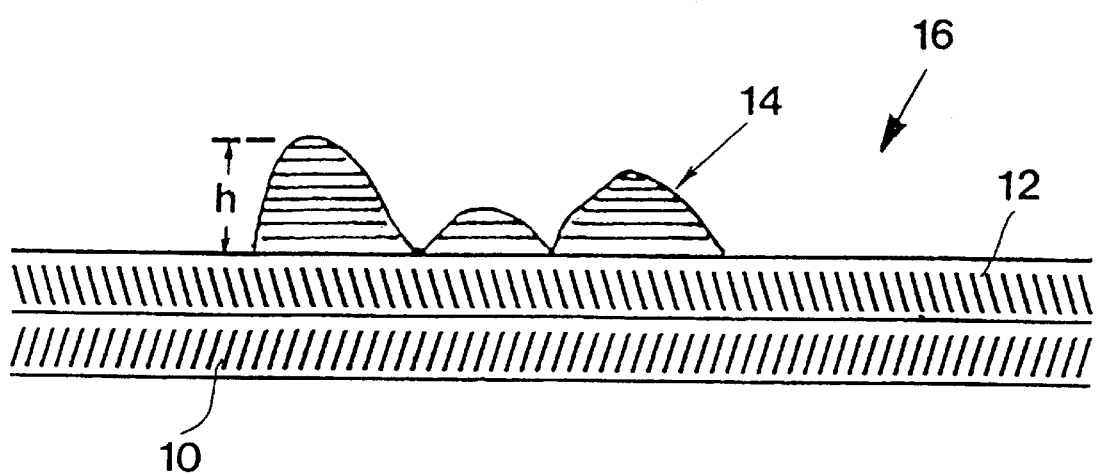

A substrate 10 in strip or web form—preferably in the form of paper (polyester-), PET-foil (polypropylene-), PP-foil or LDPE-foil, a polyethylene foil of low density—is to be capable of use as a mould or female die in the production of melamine resin surfaces or—under given conditions—also for polyester and lacquer surfaces like a structured pressing plate or pressing band, for which purpose it receives a new shape in a printing method.

A thin paper which is coated on one side of about 70 g/m$^2$ is coated with a lacquer which has a separating action in relation to melamine resin; that layer 12 of separating lacquer is acted upon by an amount of electrons such that the coating is incompletely cross-linked and in a renewed pass, printing with UV-hardening printing inks becomes possible. A shaped structure 14 of a height h and similar to a mountain range is produced on the substrate 10 above the separating layer 12 which is shown in exaggerated form in FIG. 1; the printing form of the printing cylinder (not shown) for the printing operation is of such a configuration that that shaped structure 14 is produced in markedly raised or embossed nature on the separating layer 12.

The printing ink is preferably hardened with UV-light, and then the entire composite consisting of substrate 10, separating layer 12 and shaped structure 14 standing up therefrom is hardened with high-dose electrons.

For the production for example of a laminate plate or panel in a continuously operating press, the above-described strip-shaped mould 16 is fed to the press and pressed at a pressure of between about 20 and 40 kp/cm$^2$ and a temperature of between about 160° C. and 180° C. on to the phenol films or melamine films forming the laminate. After the hardening operation the mould 16 is removed from the laminate panel or plate and wound on again; the mould can be used a plurality of times.

The structure 14 which is put on to the separating layer 12 of separating lacquer can be enriched with dyes which sublimate into the melamine layer during the pressing operation under pressure and temperature, and there colour the pore bottom; by virtue of that method, it is possible during the continuous coating of a chipboard panel or plate with melamine films to emboss the surface and at the same time to colour the structure.

EXAMPLE

A paper 10 which is coated in one stage is coated with 6 g of separating EBH-lacquer—separating layer 12—and a 10 micrometer-high structure 14 is produced, for example 'ash flower', that is to say with the pore image of an ash veneer. The irradiation dose in the first passage is in that case 0.3 Mrad while the irradiation dose in the second passage is here 3 Mrad.

What is claimed is:

1. A method for producing a mould for producing structures having a surface comprising one of a phenol film and a melamine film which contacts a surface of the mould comprising the steps of:

providing a flexible strip of material;

coating the flexible strip with an incompletely cross-linked substantially uniform separating layer which is capable of being separated from a structure having a surface of one of a phenol film and a melamine film to form a composite strip;

applying printing inks to the separating layer in a raised layer of varying heights;

UV-light hardening the printing inks to form a composite; and hardening the composite with an irradiation dose of electrons.

2. A method according to claim 1 wherein the printing inks are applied with a printing cylinder.

3. A method according to claim 1 wherein the printing inks are applied to a height of at least about 10 micrometers.

4. A method according to claim 1 wherein the raised layer is enriched with at least one dye and the dye is sublimated into the flexible strip of material during a pressing operation.

* * * * *